United States Patent Office 2,806,492
Patented Sept. 17, 1957

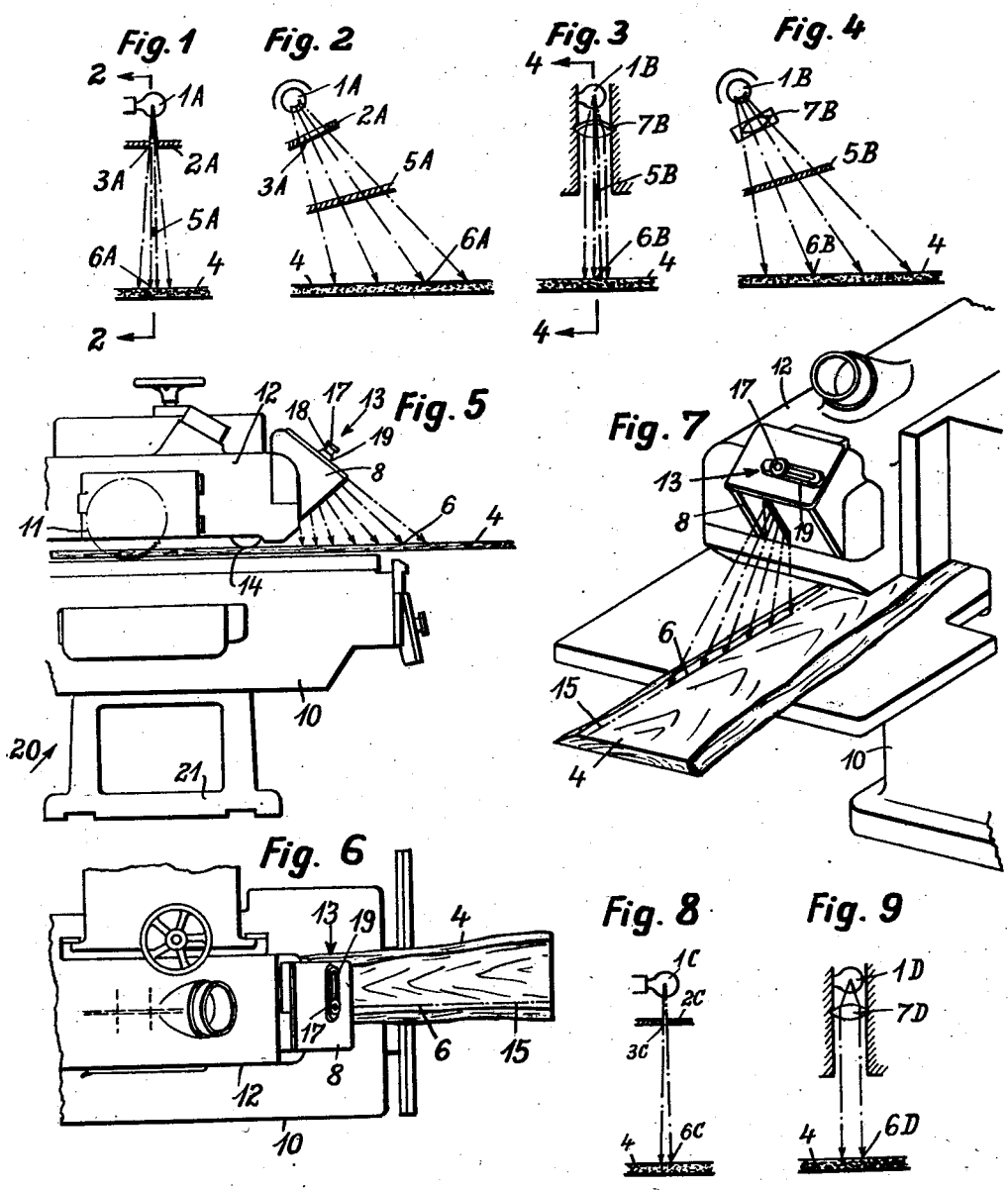

2,806,492

PROJECTED LIGHT MEANS FOR POSITIONING A WORK-PIECE ON A MACHINE TOOL

Heinrich Becker, Freiburg, Breisgau, Germany, assignor to Firma B. Raimann G. m. b. H., Freiburg, Breisgau, Germany Application December 7, 1954, Serial No. 473,700

Claims priority, application Germany April 23, 1954

1 Claim. (Cl. 143—168)

The present invention relates to machine tools.

More particularly, the invention relates to means for positioning a workpiece on a machine tool.

It is well known to use a machine tool having various means to guide a workpiece along a predetermined path. It is also well known to place suitable markings on the workpiece and to use a light source which projects indicator markings onto the workpiece, so that the markings on the workpiece can be made to coincide with the indicator markings projected by the light source. However, machine tools hitherto known have utilized only independent light sources, i. e. light sources which are not part of the machine tool itself. It has therefore been necessary, in the past, to use an extraneous light source such as an overhead light or a light source of the floor lamp type. The difficulties concomitant with such an arrangement are inconvenience of adjustment of the light source with respect to the machine tool, the obtaining of accurate positioning of the light source, the necessity of moving and relocating the independent light source at such times as it is necessary to relocate the machine tool, and the costs incident to such relocation.

It is therefore one of the objects of the present invention to eliminate the difficulty of orienting an extraneous light projector capable of projecting indicator markings onto a workpiece relative to a machine tool.

A further object of the present invention is to eliminate the need of providing a separate light source capable of projecting indicator markings.

A still further object of the present invention is to eliminate the need of providing a separate light source capable of projecting indicator markings.

A still further object of the present invention is to eliminate that part of the expense incident to the relocation of a machine tool brought about by the necessity of relocating an independent light source.

It is yet another object of the present invention to provide an adjustable light source capable of projecting indicator markings onto a workpiece.

An additional object of the present invention is the elimination of complicated adjustments of an extraneous light source relative to a machine tool.

The objects of the present invention also include the provision of a light source capable of projecting indicator markings in conjunction with a power saw. In a machine of that type it is very desirable that the light source project an indicating mark onto wood to be sawed at a point close to the edge so that, for trimming purposes the wood may be sawed very near the edge thereof, in order to accomplish the sawing with a minimum of waste.

An additional object of the present invention is to equip a machine tool with a light source for projecting indicator markings on a workpiece in which a narrow slit of light constitutes the indicator mark.

A further object of the present invention is to equip a machine tool with a light projector for projecting indicator markings on a workpiece in which the light projector includes a light source and a light shield interposed between the light source and the workpiece so that the light shield casts a shadow onto the workpiece, which shadow constitutes the indicator markings.

A still further object of the present invention is to construct a power saw having a suitable light source capable of projecting indicator markings onto wood to be sawed, which light source is fixedly mounted on the power saw so as to be substantially integral therewith.

With the above objects in view the present invention mainly consists of a machine tool having a light projector fixedly mounted thereon so as to be substantially integral therewith. The light projector is mounted on the machine body in the general region in which the workpiece is to be fed through the machine. The workpiece may first be provided with a guide mark, preferably along the line or lines along which the work is to be worked. The light projector is adapted to cast indicator markings onto the work and, during the feeding thereof through the machine tool, proper positioning of the workpiece with respect to the machine tool may be accomplished by aligning the guide marks of the workpiece with the indicator markings projected by the light source.

The novel features which are considered as characteristic for the invention are set forth in particular in the appended claim. The invention itself, however, both as to its construction and its method of operation, together with additional objects and advantages thereof, will be best understood from the following description of specific embodiments when read in connection with the accompanying drawings, in which:

Fig. 1 is a diagrammatic front view, partly in section of one type of light projector adapted to be used in a machine tool;

Fig. 2 is a side view taken along line 2—2 of Fig. 1;

Fig. 3 is a diagrammatic front view, partly in section, of another type of light projector adapted to be used with a machine tool;

Fig. 4 is a side view taken along line 4—4 of Fig. 3;

Fig. 5 is a side view of a machine tool equipped with a light projector;

Fig. 6 is a top view of the machine tool illustrated in Fig. 5;

Fig. 7 is the machine tool illustrated in Figs. 5 and 6, as seen in perspective;

Fig. 8 is a diagrammatic front view, partly in section, of a still further type of light projector adapted to be used with a machine tool; and Fig. 9 is a diagrammatic front view, partly in section, of yet another type of light projector adapted to be used with a machine tool.

While the following specification will concern itself with means for positioning a workpiece on a power saw, it will be evident to persons skilled in the art that the positioning means could equally well be used in other machine tools such as planers, shapers and the like.

Referring now to the drawings, there is shown in Figs. 5, 6 and 7 a power saw 20 having a body 10 supported on a lower supporting structure 21. The body 10 carries a support 12 which contains driving machinery adapted to rotate a saw blade 11 and a wood feeding mechanism 14. The region between the body 10 and the support 12 is adapted to receive a workpiece 4 which is engaged by the feeding mechanism 14 so as to be fed toward blade 11. While only one blade 11 is illustrated, it will be obvious that the driving machinery can well be adapted to drive a plurality of blades.

A light projector assembly housing 8 is fixedly mounted on the support 12, and is substantially integral therewith. The light projector assembly housing contains a light projector assembly which has a suitable light source adapted to project indicator markings onto the workpiece 4. The workpiece 4 may be provided with a guide mark 15. The guide mark 15 is preferably, but not necessarily disposed along the line along which the workpiece 4 is to be cut by blade 11. As is best seen in Fig. 7, the light projector assembly casts an indicating mark onto the workpiece 4 and, by aligning the guide mark 15 with the indicator mark 6 created by the light projector assembly the workpiece 4 may be properly positioned within the region between the body 10 and the support 12 so that it will be engaged by the blade 11 along a desired path.

It will be evident that instead of the guide mark 15 an edge of the workpiece 4 can, for trimming purposes, be made to coincide with the indicator mark created by the light projector assembly.

The light projector assembly is laterally adjustable with respect to the direction in which the workpiece 4 is fed. A suitable adjusting mechanism 13 is provided for this purpose. The adjusting mechanism consists of a threaded pin 18 fixedly attached to the light projector assembly which pin projects through an elongated, reinforced slot 19 disposed in the slanted upper surface of the housing 8. It can therefore be seen that the light projector assembly is movable with respect to the light projector housing 8. A threaded thumb screw 17 is threaded on the pin 18 and can be brought into frictional engagement with the edges of the reinforced slot 19 so as to lock the light projector assembly into any desired position with respect to the light projector housing 8.

It will be seen therefore that the guide mark 15 on the workpiece 4 need not coincide with the path along which the workpiece is to be engaged by the blade 11, i. e., the guide mark may be displaced from the path along which the workpiece 4 is to be cut a distance equal to the lateral distance between the indicator mark 6 created by the light projecting assembly and the saw blade 11.

Also, it will be seen that when the driving machinery drives a plurality of blades which are laterally displaced from each other, the light projecting assembly can be so adjusted that the indicator mark 6 created by it will be in the same lateral position as any one of the saw blades.

Referring now to Figs. 1 and 2, it will be seen that the light projector assembly consists of a suitable light source 1a which is adapted to cast light onto the workpiece 4. A light mask 2a having a narrow elongated slot 3a allows the light source to pass but a relatively narrow elongated beam onto the workpiece. Interposed between the mask and the workpiece is a suitable light shield 5a, preferably of very thin elongated configuration. The light shield is positioned to cooperate with the elongated slot so that a sharply defined elongated shadow 6a will be cast upon the workpiece. The position of the workpiece may thereupon be adjusted so that the shadow created by the light projector assembly may be made to coincide with the guide mark 15 on the workpiece.

While the light projector assembly has been described as casting a sharply defined narrow elongated shadow, it will be obvious that by using a light mask having a slot of different configuration, together with appropriate light shielding means, it will be possible to cast indicator markings onto the workpiece of any desired configuration.

The light projector assembly shown in Figs. 3 and 4 is similar to the light projector assembly shown in Figs. 1 and 2 except that a focusing lens 7b is used in lieu of a light mask. The lens 7b is adapted to focus light rays emitted by a light source 1b into a relatively narrow elongated beam, which beam is projected onto the workpiece 4. Similarly, a suitable light shield 5b, preferably of very thin elongated configuration, is positioned to cooperate with the lens so that a sharply defined elongated shadow 6b will be cast upon the workpiece.

The light projector assembly shown in Fig. 8 is similar to the light projector shown in Figs. 1 and 2 except that the light shielding means has been eliminated. A light source 1c is adapted to cast light onto the workpiece 4, and a light mask 2c having a narrow elongated slot 3c allows the light source to pass but a relatively narrow elongated beam onto the workpiece. While in this embodiment it is desirable to use a light mask having an elongated slot narrower than the slot of the light mask used in the embodiment illustrated in Figs. 1 and 2, it will be obvious that the instant embodiment makes use of a solid beam of light 6c which beam of light, per se, constitutes the indicator markings.

The light projector assembly shown in Fig. 9 is similar to the light projector assembly shown in Figs. 3 and 4 except that the light shielding means has been eliminated. A lens 7d is adapted to focus light rays emitted by a light source 1d into a relatively narrow elongated beam 6d, which beam is projected onto the workpiece 4. The instant embodiment is similar to the light projector assembly shown in Fig. 8 in that it makes use of a solid beam of light which beam of light, per se, constitutes the indicator markings. Also, in the instant embodiment it is desirable to utilize a lens which focuses the light beam more sharply onto the workpiece than does the lens used in conjunction with the embodiment illustrated in Figs. 3 and 4.

It will be understood that each of the elements described above, or two or more together, may also find a useful application in other types of machines tools differing from the types described above.

While the invention has been illustrated and described as embodied in a power saw, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

A machine tool comprising, in combination, a machine body having an upright frame with a work supporting member intermediate its height and a frame part located higher than said work supporting member; tool means on said machine body for working a work piece while supported by said work supporting member; and light projecting means for projecting an indicating beam onto a work piece supported by said work supporting member, said light projecting means mounted on said frame part located higher than said work supporting member in such a manner that said light projecting means occupies a predetermined position relative to said work supporting member, whereby an indicating mark on the work piece may be brought into registration with said indicating beam so that the work piece occupies a predetermined position relative to said work supporting member and said tool means.

References Cited in the file of this patent

UNITED STATES PATENTS

| | | |
|---|---|---|
| 1,804,764 | Grant | May 12, 1931 |
| 1,841,867 | Wiegelmann | Jan. 19, 1932 |
| 1,959,667 | Grant | May 22, 1934 |
| 2,109,849 | Price | Mar. 1, 1938 |
| 2,510,471 | Horstkotte | June 6, 1950 |

FOREIGN PATENTS

| | | |
|---|---|---|
| 251,192 | Switzerland | July 16, 1948 |